Aug. 19, 1941.    F. C. WINKLER ET AL    2,253,409
LIGHT PROJECTOR
Filed Nov. 12, 1938
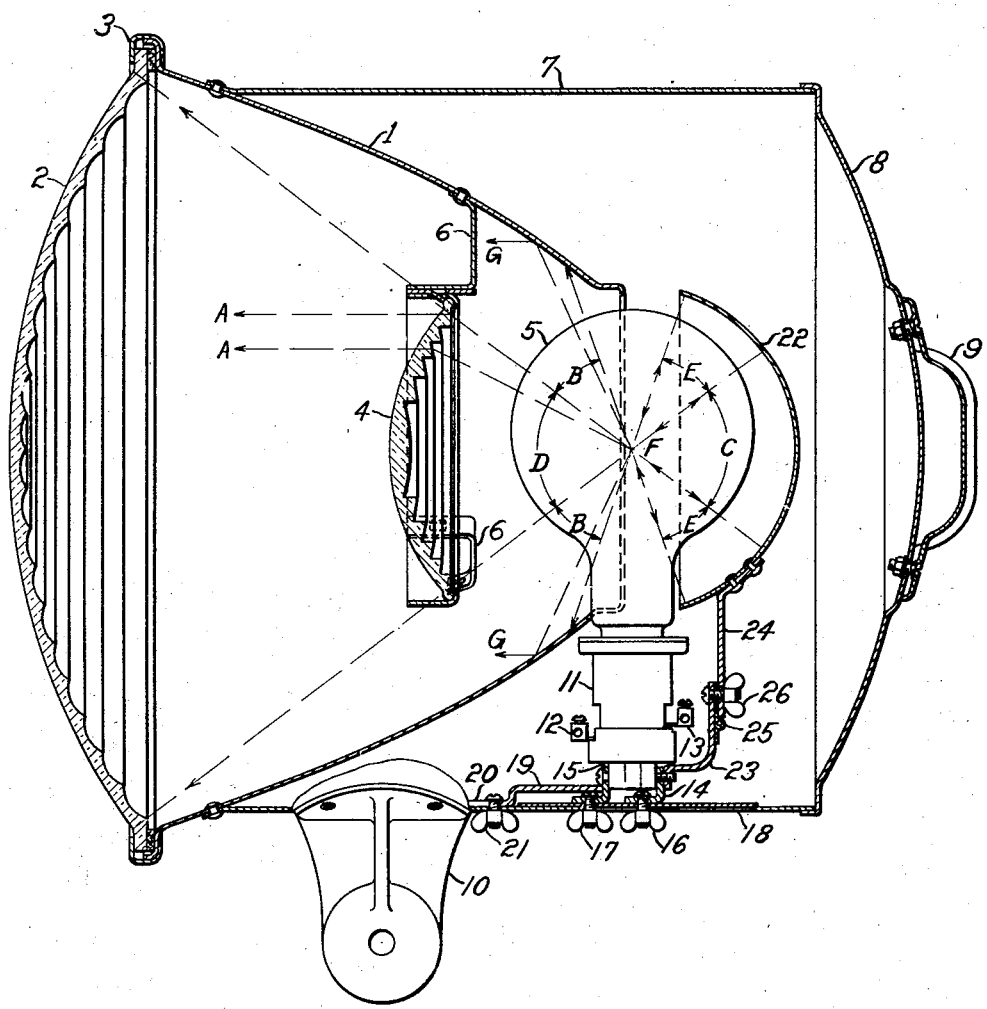
WITNESSES:
Wm. B. Sellers.
Eugene J. Roberts.
INVENTORS
Frederic C. Winkler and
Irvine A. Yost.
BY
G. M. Crawford
ATTORNEY Patented Aug. 19, 1941

2,253,409

UNITED STATES PATENT OFFICE 2,253,409

LIGHT PROJECTOR

Frederic C. Winkler and Irvine A. Yost, Lakewood, Ohio, assignors to Westinghouse Electric & Manufacturing Company, East Pittsburgh, Pa., a corporation of Pennsylvania Application November 12, 1938, Serial No. 239,909

3 Claims. (Cl. 240—41.3)

Our invention relates, generally, to light projectors, and in particular, to light projectors in which directional control of substantially all of the light produced by the light sources is provided.

The object of our invention, generally stated, is to provide a light projector of an improved type which is of simple construction, economical to manufacture and which is highly efficient in operation.

A more specific object of our invention is to provide for directional control of substantially all the light produced by the light source of a light projector.

Another object of our invention is to provide an optical system for a light projector which shall function to produce directional control of substantially all of the light emitted from the projector.

A further object of our invention is to provide for utilizing a reflector and lens system in a light projector for effecting directional control of substantially all of the light emitted therefrom.

A still further object of our invention is to provide for utilizing a spherical reflector and a concentrating lens in conjunction with a parabolic reflector in a light projector to produce directional control of substantially all of the light emitted therefrom.

Another object of our invention is to provide a light projector of the above-described character wherein provision is made for readily relamping the projector and for readily adjusting the spread of the light beam produced thereby.

These and other objects will become evident from the detailed description and the accompanying drawing, in which the single figure is a sectional view of a light projector embodying the principal features of our invention.

Referring to the drawing, the single figure of which illustrates a preferred embodiment of our invention, reference character 1 designates a parabolic reflector with a specular reflecting surface, such for example, as polished aluminum or mirror glass and the like. The reflector 1 has a circular opening in the back thereof concentric with the axis of the reflector, and is mounted in front of a light source 5. The lamp 5 is positioned so that its filament is coincident with the axis of the reflector, the lamp being longitudinally movable within the opening of the reflector along the axis of such reflector.

In this instance, the projector is provided with a rectilinear spread lens 2 supported at the front of the parabolic reflector by a channel member 3, although it is to be understood that a plain clear lens or one having a circular spread may be used in lieu of the rectilinear spread lens if different designs of beam pattern are desired.

To control the direction of a portion of the light emitted from the light projector which is explained in detail hereinafter, a concentrating concavo-convex lens 4 is positioned in front of the lamp 5, being mounted within the parabolic reflector 1 and supported by a suitable number of brackets 6, which may be bolted or riveted to the parabolic reflector.

An exterior casing 7 surrounds the lamp 5 and parabolic reflector 1. The casing is suitably joined to the front portion of the reflector 1 and is provided with a removable end cover 8 having a handle 9. A bracket 10 is fastened to the exterior of the casing 7 and may be provided with an opening therein to permit pivotal mounting of the light-projector on a base, which is not shown.

A socket 11, having terminals 12 and 13, is provided for supporting the lamp 5 within the casing. In order to provide for obtaining the desired beam pattern, provision is made for adjustably mounting the lamp socket for movement axially of the projector on the bottom wall of the casing. A pair of L-shaped brackets 14 and 15 are secured rigidly to the socket. Thumbscrews 16 and 17 pass through these L-shaped brackets and engage a slot 18 in the casing. In order that any selected position of the lamp may be maintained, an adjustable stop member 19, having a slot 20 therein and a cooperating thumbscrew 21, is provided to limit the forward movement of the socket 11 along the slot 18. As will be readily understood, this arrangement provides for readily adjusting the light source or lamp 5 relative to the reflector 1.

A spherical reflector 22 having a polished or specular finish is mounted behind and partially surrounds the lamp on the side opposite the concentrating lens 4. The reflector is pivotally mounted upon the socket 11 by means of brackets 23 and 24 and a hinge member 25. A thumbscrew 26 locks the hinge member in an upright position. The spherical reflector 22 is so mounted with respect to the lamp 5 that the point of radius of the reflector is coincident with the filament of the lamp and serves to control the direction of the light rays which are emitted towards the rear of the projector.

An important feature of our invention lies in the optical system of the projector whereby directional control of practically all of the light output of the lamp is obtained, which eliminates uncontrolled spill light and greatly increases the efficiency of the projector.

To explain this directional control, it may be assumed, for example, and not by way of limitation, that the filament of the lamp is a point source of light and is situated at point F, which is the focal point of the parabolic reflector 1 and the focal point of the concentrating lens 4. The point of radius for the polished spherical reflector 22 is coincident with the point source of light, as explained hereinbefore. Hence, all light rays emitted by the filament at point F which are accepted by the spherical reflector 22 will be reflected back through the point F and will emerge from the opposite side of the lamp, after which such rays are controlled either by the concentrating lens 4 or the reflector 1.

In most lighting units, any light emitted from the filament within the angle D is not directly controlled, and is termed "direct" or "spill" light. The concentrating concavo-convex lens 4 is, therefore, employed to control the direction of the light within the angle D and also to control the direction of the light within the angle C which is accepted by the spherical reflector 22 and returned through the filament of the lamp, as explained hereinbefore. The concentrating lens 4 is rigidly secured with respect to the parabolic reflector 1 in such a position that the focal point of the concentrating lens and the focal point of the parabolic reflector are coincident. All light within the angles D and C passing through the concentrating lens 4 is thus directionally controlled, and is emitted from the projector in rays which are parallel to the axis of the projector, as represented by the lines A—A.

The parabolic reflector 1 is utilized to control the direction of the light which is emitted from the filament within the angles B and also to control the direction of the light within the angles E which is accepted by the spherical reflectors 22 and returned, as hereinbefore explained, through the filament of the lamp. Thus the light within angles B and E passing directly to the parabolic reflector 1 is also directionally controlled, and hence is emitted from the projector in rays which are parallel to the projector. These light rays are represented by the lines G—G.

It can be seen that for this particular setting of the lamp 5 in which the focal points of the parabolic reflector 1, the spherical reflector 22 and concentrating lens 4 are coincident with the filament of the lamp, substantially all of the light emitted from the lamp filament is projected in rays which are parallel to the axis of the projector.

As stated before, the rectilinear spread lens 2 may be replaced with other types of lens depending upon the type of beam pattern desired.

Another feature of our invention is the adjustable lamp socket 11 which may be moved axially of the light projector to vary the size of the beam pattern. Variation in beam pattern size may be obtained by loosening the thumbscrews 16, 17 and 21 and moving the lamp socket 11 along the slot 18 in the casing towards or away from the concentrating lens 4; a movement towards the lens 4 increases the beam spread, while a movement away decreases beam spread.

Lamp replacements may be made expeditiously by removing the end cover 8 and removing thumb-screw 26. This will allow the reflector 22 to pivot on the hinge 25 away from the lamp 5. Thumb-screws 16 and 17 are then loosened and the socket 11 moved in the slot 18 so that the lamp can be removed from within the opening of the reflector 1. A new lamp is now installed and the spherical reflector 22 fixed in position adjacent the lamp 5. The socket 11 is now moved forward in the slot 18 until the L-shaped bracket 15 abuts the stop member 19. Thumb-screws 16 and 17 are then tightened and the end cover 8 replaced.

It will be evident from the foregoing description that we have provided an improved form of a light projector in which substantially all of the light is directed in one general direction parallel to the axis of the projector, thereby eliminating "spill" or directionally uncontrolled light, which is very undesirable where the application for floodlighting demands a close control of the direction of light emission. We have also provided a light projector of simple and economical construction which may be readily relamped and otherwise maintained in efficient operating condition.

Numerous changes and modifications may be made in our invention without departing from the spirit and scope thereof, and we desire, therefore, that only such limitations shall be placed thereon as are imposed by the prior art.

We claim as our invention:

1. In a light projector, the combination of a main parabolic reflector, said reflector being provided with an opening at the back thereof defined by a transverse plane passed through said reflector substantially at the focus thereof, an enclosing casing for said reflector provided with a removable end cover and a slot in the underside thereof, a convex stepped lens of a diameter substantially equal to the diameter of said reflector opening, means for mounting said lens within said reflector coaxially therewith and at such a point on said axis that the foci of said lens and said reflector are coincident, a lamp comprising a light source and an enclosing light transmitting envelope therefor, a socket for supporting said lamp with the light source coaxially with said reflector, means engaging said slot in the underside of said casing for supporting the socket and providing for movement therealong, an adjustable stop member engaging said slot for limiting forward travel of said socket, a separate spherical reflector, means for mounting said spherical reflector on said socket concentric with said light source and partially enclosing said envelope, said means including a hinge member to permit said spherical reflector to be moved pivotally from its normal upright position for lamp replacements and a front spread lens for the main reflector.

2. In a light projector, the combination of a main parabolic reflector, said reflector being provided with an opening in the back thereof defined by a plane passed transversely through said reflector at substantially the focal point thereof, an enclosing casing for said reflector provided with a removable end cover and a slot in the underside thereof, a concave-convex lens of a diameter substantially equal to the size of said reflector opening, means for supporting said lens within said reflector and in such a position that the focal points of said reflector and said lens are coincident, a lamp comprising a light source and an enclosing light transmitting envelope therefor, a socket for supporting said lamp with the light source coaxially with said reflector, a separate spherical reflector, means for supporting said spherical reflector on said socket concentric with said light source opposite the opening in said reflector and partially enclosing said envelope, said last means including a hinge member to permit said spherical reflector to be moved pivotally from its normal upright position for lamp replacement, means engaging said slot provided in the underside of the casing for supporting the socket for movement therealong to permit said light source to be adjusted to a plurality of positions along the axis of said parabolic reflector on either side of the focal point thereof, a socket stop member adjustable to a plurality of positions along said slot for limiting the forward travel of said socket to a preselected position, and a front spread lens for controlling the pattern of the light beam produced by the projector.

3. In a light projector, the combination of a casing having a slotted portion therein, a main parabolic reflector mounted in said casing, said reflector being provided with an opening defined by a plane passed transversely through said reflector at substantially the focal point thereof, a light source, lens means for imparting directional control to light rays emitted by said source and not accepted by said parabolic reflector, means for supporting said lens means within said parabolic reflector in front of the light source, a socket for supporting said light source coaxially with said reflector, a separate spherical reflector, means for supporting said spherical reflector on said socket concentric with said light source and opposite the opening in said parabolic reflector back of the light source, means engaging the slotted portion in said casing for the support of said socket, said socket supporting means being movable forwardly along said slotted portion to a position of focus for said light source relative to said reflector and movable rearwardly therealong to permit replacement of said light source, an adjustable socket stop member engaging said slotted portion of said casing for limiting forward movement of said socket, and a front lens for the main reflector controlling the pattern of light beam projected.

FREDERIC C. WINKLER.
IRVINE A. YOST.